United States Patent
Chen et al.

(10) Patent No.: US 8,405,241 B2
(45) Date of Patent: Mar. 26, 2013

(54) SEESAW-TYPE WAVE POWER GENERATING DEVICE

(75) Inventors: Shih-Hsiung Chen, Yongkang (TW); Cheng-Shi Weng, Yongkang (TW)

(73) Assignee: Shih-Hsiung Chen, Tainan County (TW)

( * ) Notice: Subject to any disclaimer, the term of this patent is extended or adjusted under 35 U.S.C. 154(b) by 386 days.

(21) Appl. No.: 12/944,838

(22) Filed: Nov. 12, 2010

(65) Prior Publication Data

US 2011/0169265 A1    Jul. 14, 2011

(30) Foreign Application Priority Data

Jan. 12, 2010   (TW) .............................. 99200559 U (51) Int. Cl.
*F03B 13/10* (2006.01)
*F03B 13/12* (2006.01)
*H02P 9/04* (2006.01)
*F03B 13/18* (2006.01)
*F04B 17/00* (2006.01)
*F04B 35/00* (2006.01)

(52) U.S. Cl. .............................. 290/53; 60/497; 417/331
(58) Field of Classification Search .................... 290/53; 60/497; 417/331
See application file for complete search history.

(56) References Cited

U.S. PATENT DOCUMENTS

| | | | | |
|---|---|---|---|---|
| 1,665,140 A * | 4/1928 | Master | ............ | 417/331 |
| 3,126,830 A * | 3/1964 | Dilliner | ............ | 417/331 |
| 4,076,463 A * | 2/1978 | Welczer | ............ | 417/331 |
| 4,203,294 A * | 5/1980 | Budal et al. | ............ | 60/497 |
| 4,218,192 A * | 8/1980 | West | ............ | 417/333 |
| 5,349,819 A * | 9/1994 | Margittai | ............ | 60/398 |
| 5,426,332 A * | 6/1995 | Ullman et al. | ............ | 290/53 |
| 5,872,406 A * | 2/1999 | Ullman et al. | ............ | 290/53 |
| 5,975,865 A * | 11/1999 | Manabe | ............ | 417/331 |
| 6,140,712 A * | 10/2000 | Fredriksson et al. | ............ | 290/53 |
| 6,457,307 B1 * | 10/2002 | Feldman et al. | ............ | 60/398 |
| 2008/0315590 A1 * | 12/2008 | Reyes-Florido | ............ | 290/52 |
| 2011/0169266 A1 * | 7/2011 | Song | ............ | 290/53 |
| 2012/0047885 A1 * | 3/2012 | Shyu | ............ | 60/398 |
| 2012/0248777 A1 * | 10/2012 | Ikemura | ............ | 290/54 |

FOREIGN PATENT DOCUMENTS

| | | |
|---|---|---|
| TW | 499543 | 8/2002 |
| TW | I313319 B | 8/2009 |

* cited by examiner

*Primary Examiner* — Pedro J Cuevas
(74) *Attorney, Agent, or Firm* — Chun-Ming Shih; HDLS IPR Services (57) ABSTRACT

A seesaw-type wave power generating device (1) includes: a first buoy (10); a second buoy (20) disposed on one side of the first buoy (10); an impeller generator (30) disposed between the first buoy (10) and the second buoy (20); a first connecting pipe (42) having both ends communicated with the first buoy (10) and the impeller generator (30); and a second connecting pipe (42) having both ends communicated with the second buoy (20) and the impeller generator (30). A liquid (2) is filled in the first buoy (10) and the second buoy (20). The first buoy (10) and the second buoy (20) bob on the water and water waves (4) causes the liquid (2) to flow back and forth between the first connecting pipe (41) and the second connecting pipe (42), thereby driving the impeller generator (30) to generate electricity. The present invention is easy for implementation and maintenance.

10 Claims, 11 Drawing Sheets

SEESAW-TYPE WAVE POWER GENERATING DEVICE

BACKGROUND OF THE INVENTION

1. Field of the Invention

The present invention relates to a water power generating device, in particular to a wave power generating device.

2. Description of Prior Art

Since the amount of petroleum stored all over the world is limited and the global warming is getting serious, many nations in the world have already paid attention to develop new power-generating technology by using renewable energies and inexhaustible natural resources (such as solar power, wind power and ocean power) because they have lower impact on the earth environment.

Wave power generation is a power-generating technology for generating electricity by using ocean wave power, which has low impact on the earth environment and it is inexpensive and safe. According to the estimation made by resource experts, 0.1 percentage of the dynamic energy of the ocean wave can generate five times the amount of electricity necessary for the whole world. Thus, it is very worthy to develop the technology of ocean power generation. Especially in island countries, costal areas usually have continuous waves caused by monsoons. Therefore, the continuous waves can be used to generate a large amount of electricity.

Taiwan Patent No. I313319 and 499543 disclose a wave power generating device for converting the dynamic energy of the ocean waves into electricity. The wave power generating device disclosed in these patent documents is fixed on a support. Buoys are configured to drive a telescopic pump. The telescopic pump generates air to drive a pneumatic impeller for generating electricity. However, the telescopic pump and the support may suffer damage easily due to the lash of ocean waves, which makes the telescopic pump unable to generate air stably. On the other hand, since the wave power generating device is disposed in the ocean, the maintenance is uneasy. Further, the density of air is much smaller than that of the water, so that the dynamic energy of compressed air is much less than that of moving water. As a result, such a small dynamic energy of compressed air merely generates a limited amount of electricity and its power-generating efficiency is insufficient and uneconomical.

In view of the above, the present Inventor proposes a novel and reasonable structure in order to solve the above-mentioned problems based on his research and expert knowledge.

SUMMARY OF THE INVENTION

The present invention is to provide a seesaw-type wave power generating device, which floats on the water for easy maintenance.

The present invention is to provide a seesaw-type wave power generating device, which has a simple structure for easy implementation.

The present invention provides a seesaw-type wave power generating device, in which a liquid is filled. The wave power generating device includes a first buoy, a second buoy, an impeller generator, a first connecting pipe and a second connecting pipe. The second buoy is disposed on one side of the first buoy with an interval. The impeller generator is disposed between the first buoy and the second buoy. One end of the first connecting pipe is in communication with the first buoy, and the other end thereof is in communication with the impeller generator. One end of the second connecting pipe is in communication with the second buoy, and the other end thereof is in communication with the impeller generator. The liquid is filled in the first buoy and the second buoy. The first buoy and the second buoy bob on the water and water waves causes the liquid to flow back and forth between the first connecting pipe and the second connecting pipe, thereby driving the impeller generator to generate electricity.

In comparison with prior art, the seesaw-type wave power generating device according to the present invention has a plurality of buoys floating on the water, so that the maintenance thereof is easy. Since the seesaw-type wave power generating device according to the present invention bobs due to water waves, the liquid moves back and forth between the first buoy and the second buoy. When the liquid moves from one buoy to the other buoy, the moving liquid drives the impeller generator to rotate, thereby generating electricity. Thus, the present invention has a simple structure for easy implementation. Further, check valves may be provided in the intersecting portions between the buoys and the connecting pipes to open or close in an alternate manner, thereby making the impeller generator to rotate continuously for generating electricity. Thus, the present invention really demonstrates an improved practicability.

DETAILED DESCRIPTION OF THE INVENTION

The detailed description and technical contents of the present invention will become apparent with the following detailed description accompanied with related drawings. It is noteworthy to point out that the drawings is provided for the illustration purpose only, but not intended for limiting the scope of the present invention.

Figure 1:
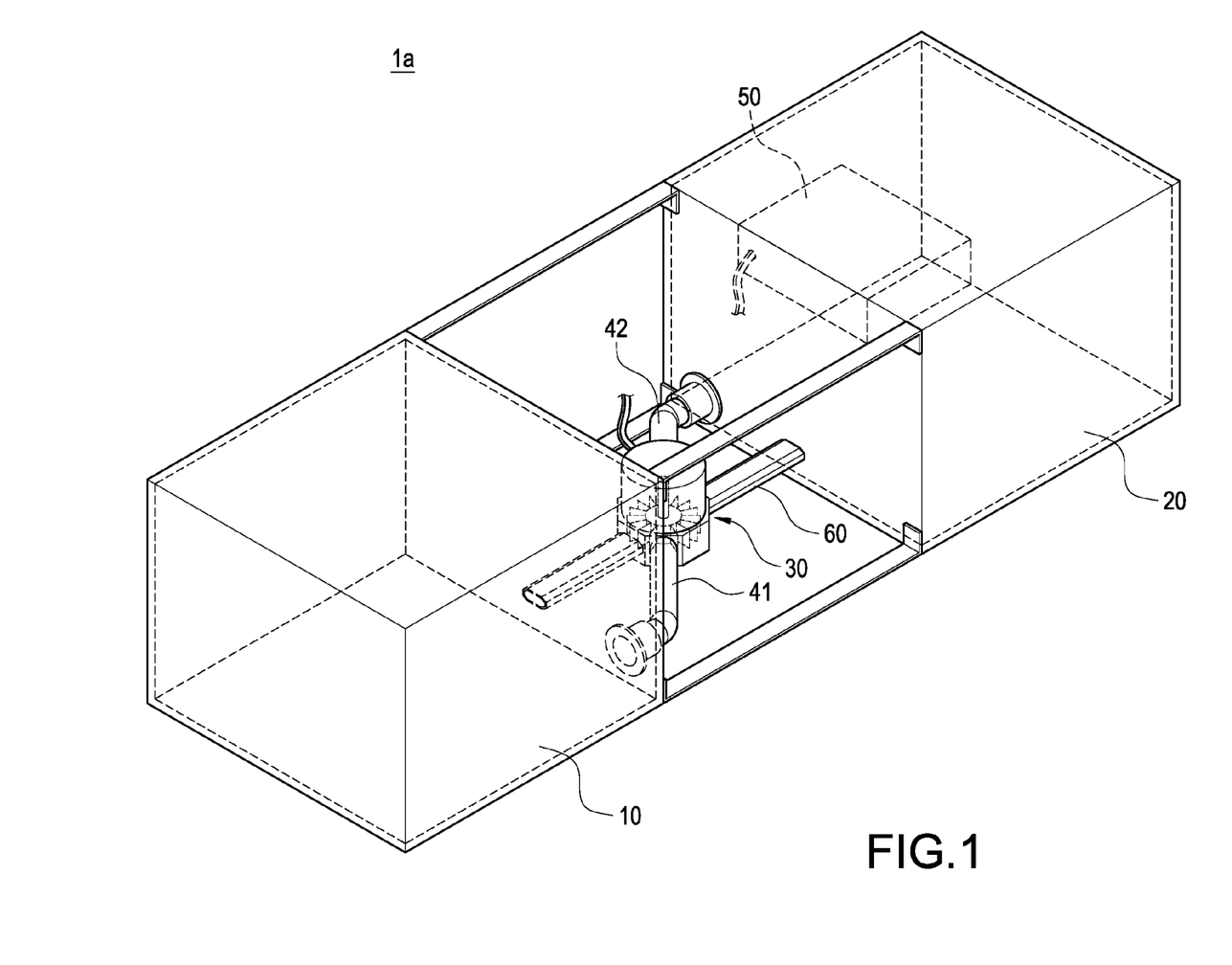
FIG. 1 is a perspective view showing an external appearance of a first embodiment in accordance with the present invention.

Please refer to FIG. 1, which is a schematic view showing the external appearance of the seesaw-type wave power generating device according to the first embodiment of the present invention. The seesaw-type wave power generating device 1a of the present invention includes a first buoy 10, a second buoy 20, an impeller generator 30, a first connecting pipe 41 and a second connecting pipe 42.

Each of the first buoy 10 and the second buoy 20 has a hollow casing. The second buoy 20 is disposed on one side of the first buoy 10 at an interval. The impeller generator 30 is disposed between the first buoy 10 and the second buoy 20.

The first connecting pipe 41 is in communication with the first buoy 10 and the impeller generator 30. The second connecting pipe 42 is in communication with the second buoy 20 and the impeller generator 30. One end of the first connecting pipe 41 is in communication with the first buoy 10, and the other end thereof is in communication with the impeller generator 30. One end of the second connecting pipe 42 is in communication with the second buoy 20, and the other end thereof is in communication with the impeller generator 30.

The seesaw-type wave power generating device 1a includes a control box 50. The control box 50 comprises a control module and a power storage unit (not shown). The power storage unit is electrically connected to the impeller generator 30 for storing the electricity generated by the impeller generator 30 from the dynamic energy of the waves. The control box 50 may be disposed in the first buoy 10 or the second buoy 20. Alternatively, the control box 50 may be provided adjacent to the first buoy 10 or the second buoy 20. The impeller generator 30 is supported on a fixing support 60 connected between the first buoy 10 and the second buoy 20.

Figure 2:
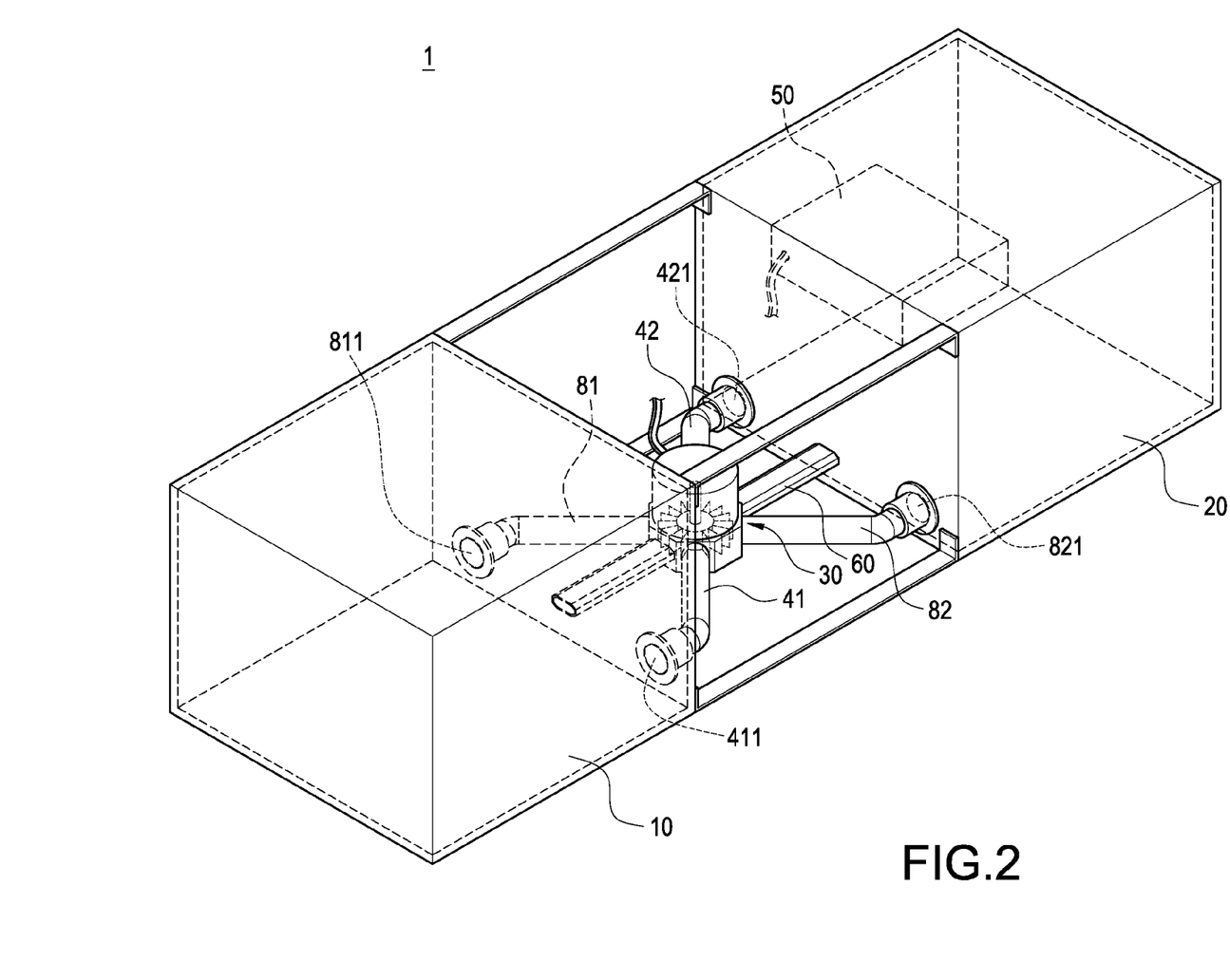
FIG. 2 is a perspective view showing an external appearance of a second embodiment in accordance with the present invention.
Figure 3:
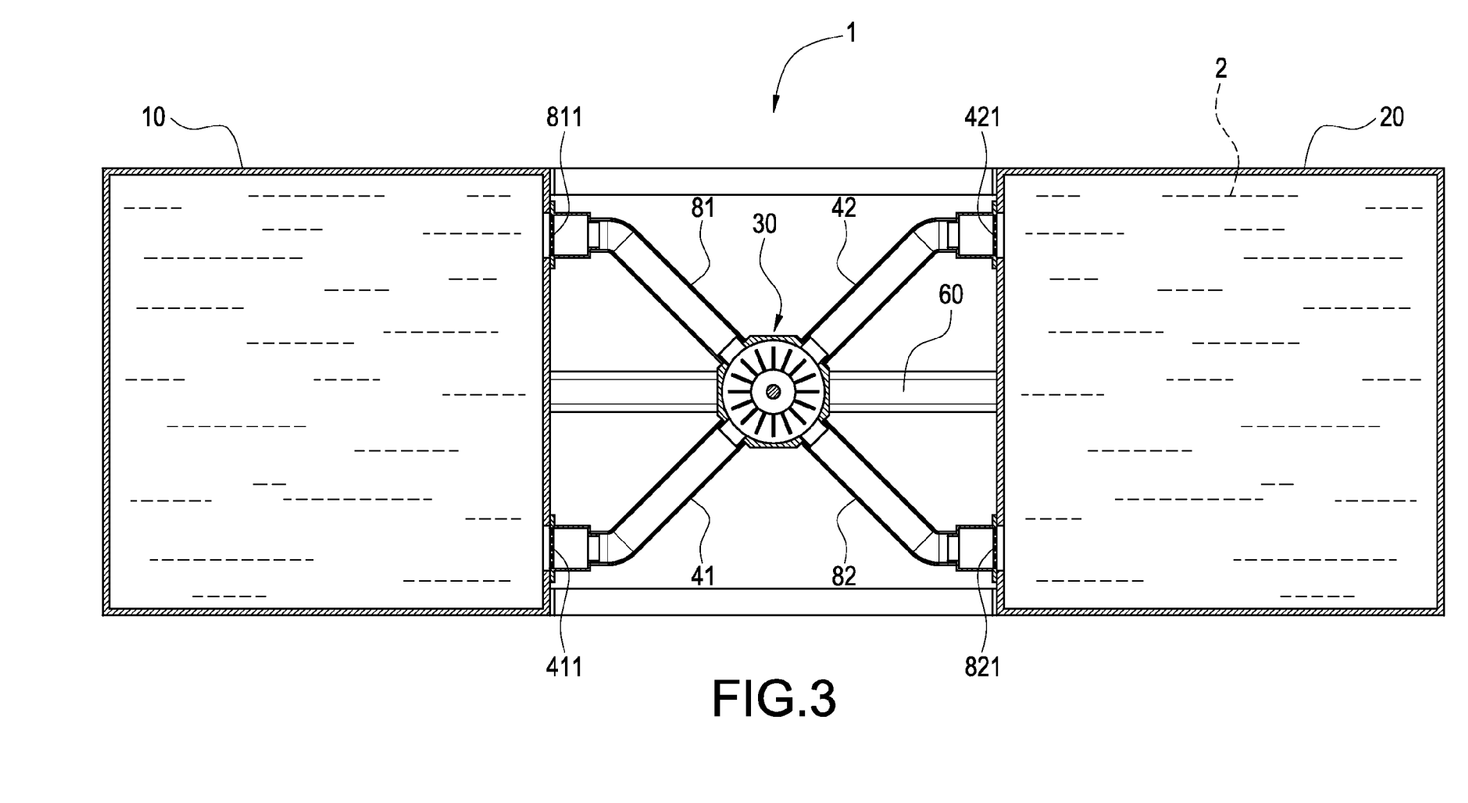
FIG. 3 is a top view of FIG. 2.
Figure 4:
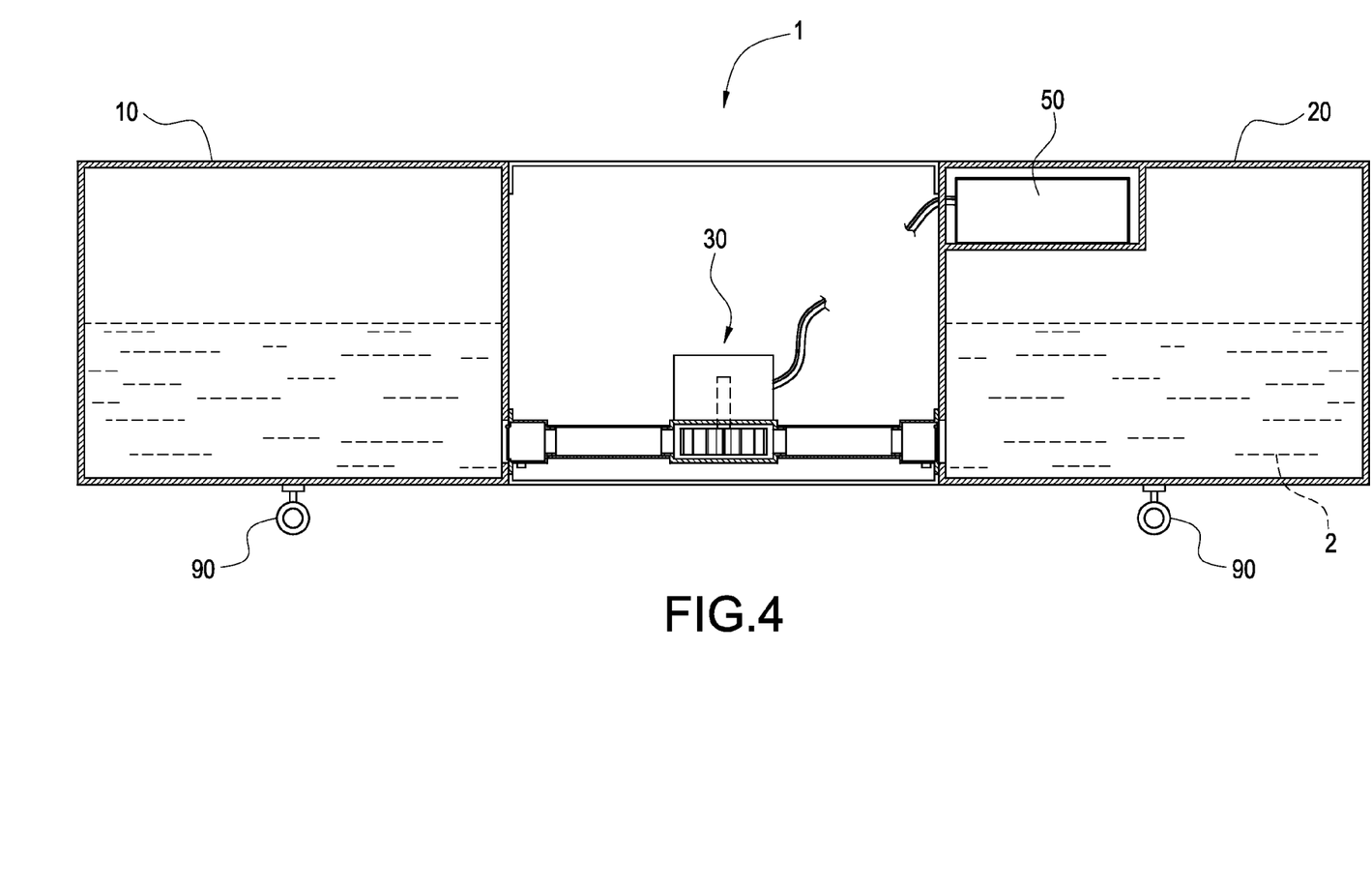
FIG. 4 is a side view of FIG. 2.
Figure 5:
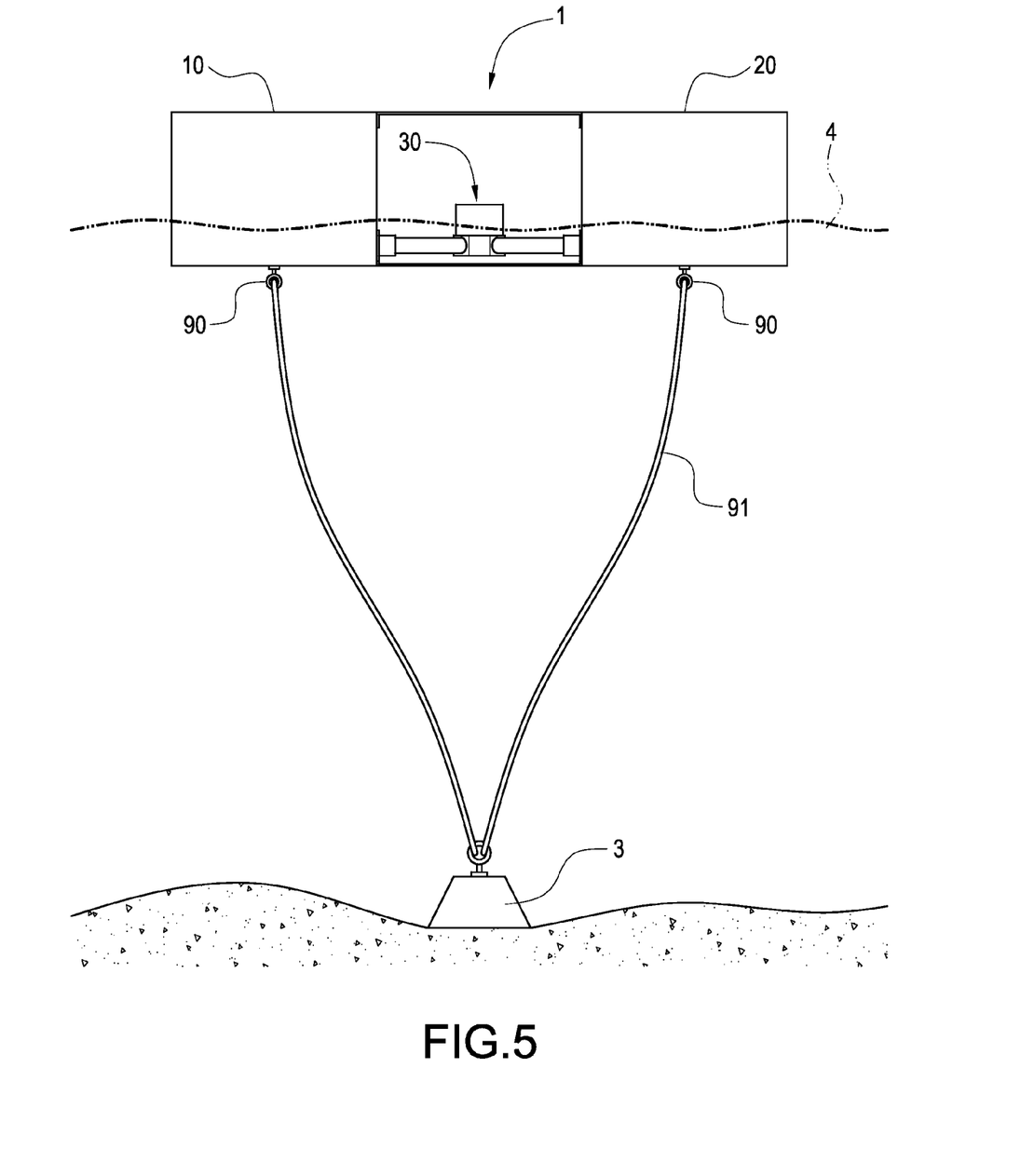
FIG. 5 is a schematic view showing the device of the present invention.
Figure 6:
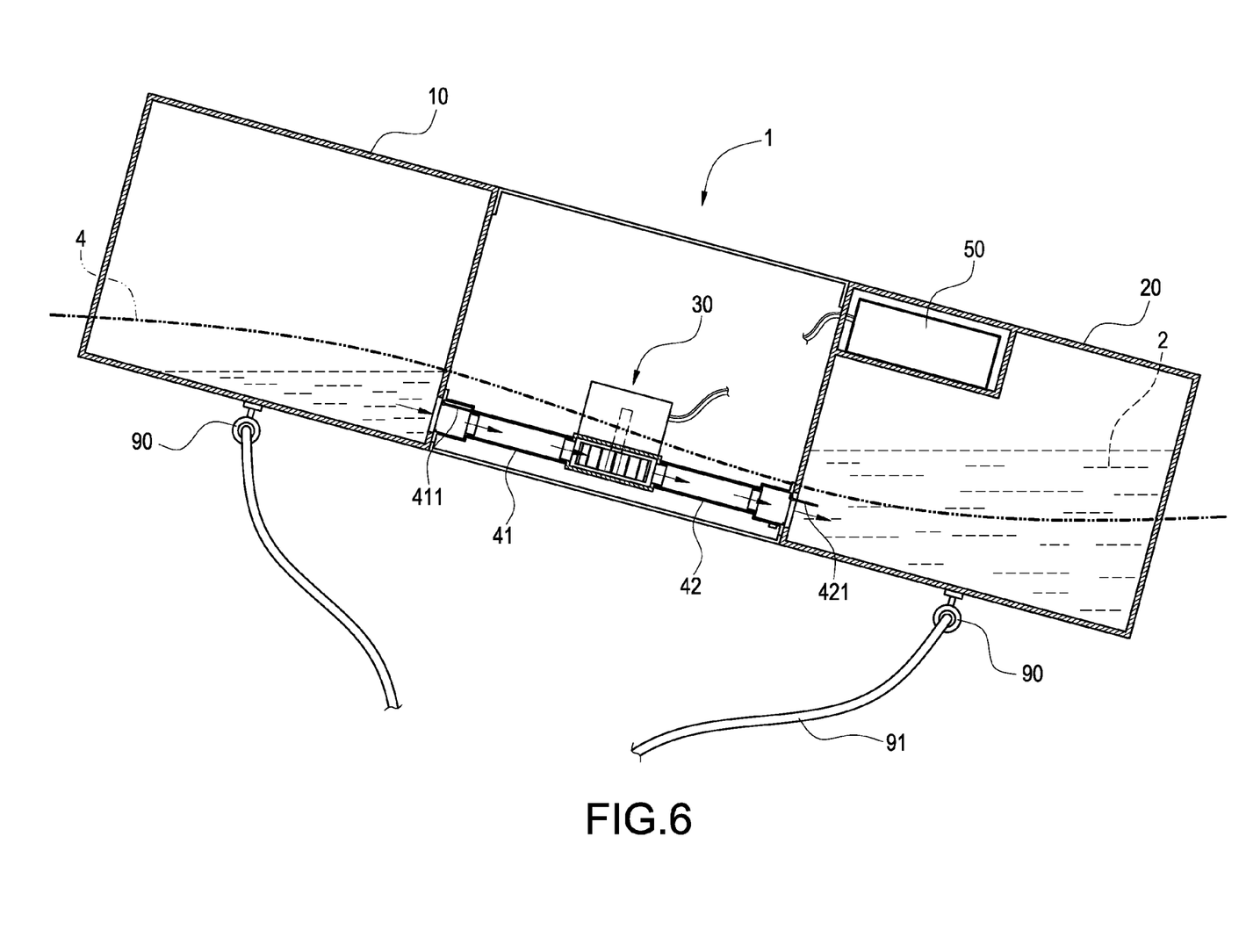
FIG. 6 is a schematic view (I) showing a condition of the present invention in which the first buoy is located in a higher position.
Figure 7:
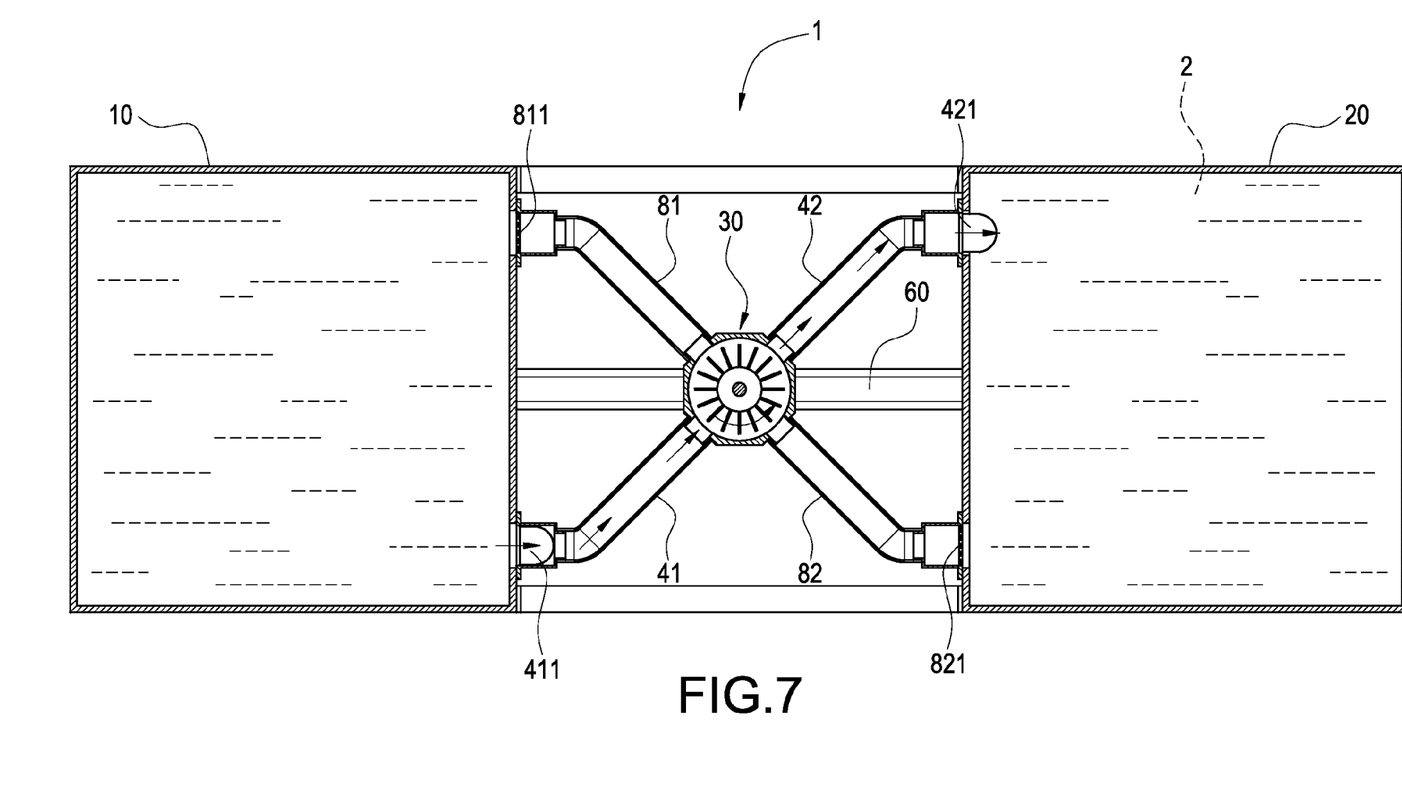
FIG. 7 is a schematic view (II) showing a condition of the present invention in which the second buoy is located in a higher position.
Figure 8:
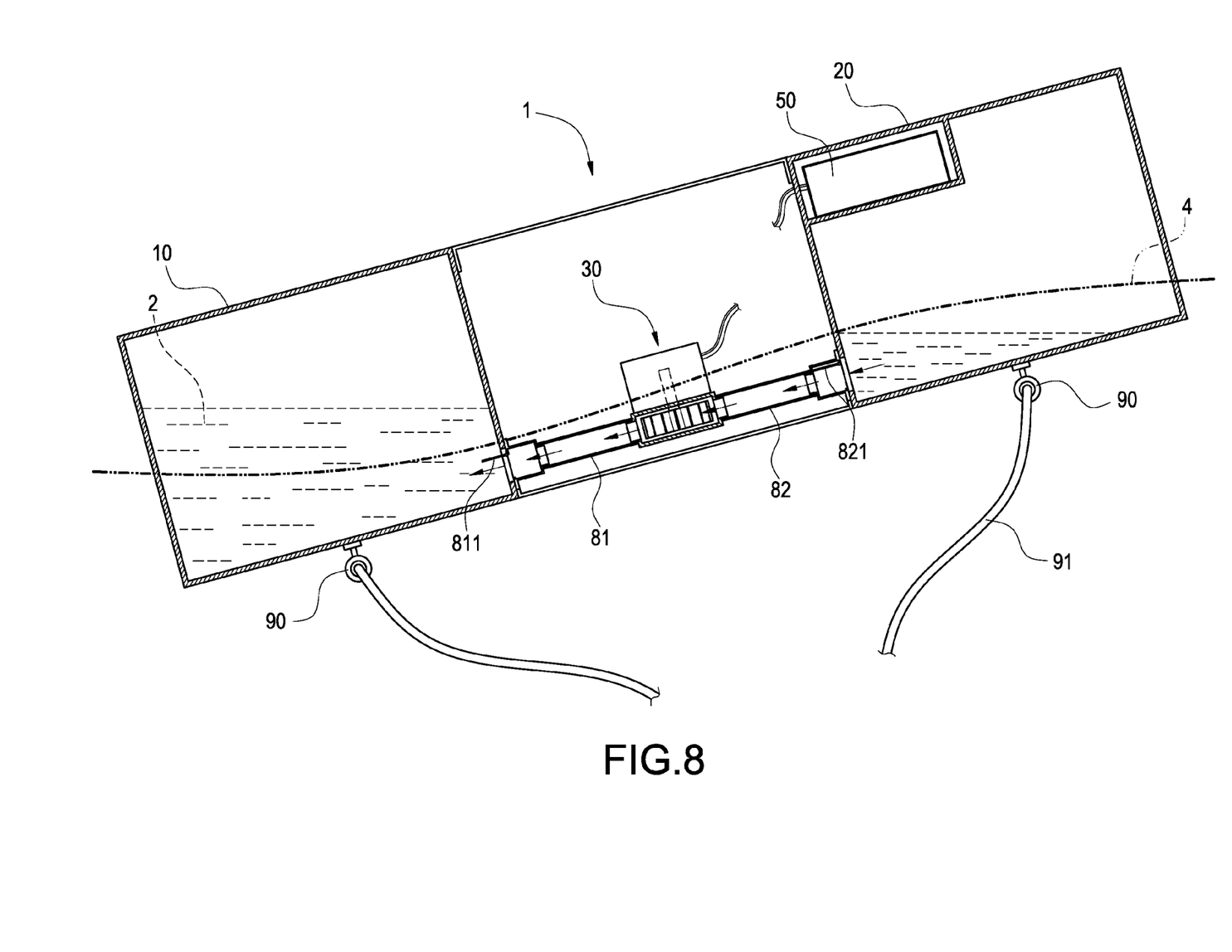
FIG. 8 is a schematic view (I) showing a condition of the present invention in which the second buoy is located in a higher position.
Figure 9:
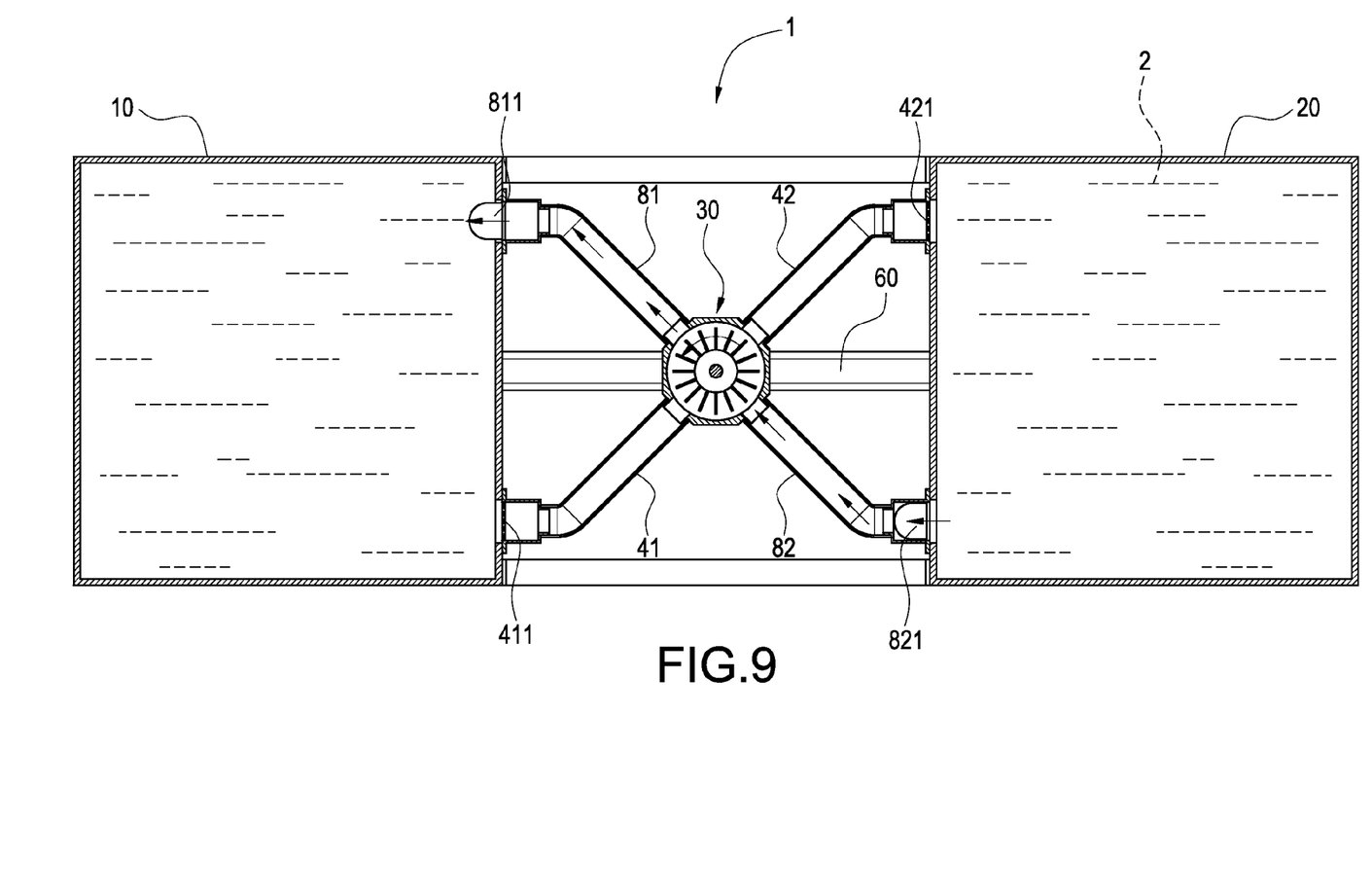
FIG. 9 is a schematic view (II) showing a condition of the present invention in which the second buoy is located in a higher position.

Please refer to FIGS. 2 to 4, which are a perspective view, a top view and a side view showing the seesaw-type wave power generating device according to the second embodiment of the present invention respectively. The second embodiment is a preferred embodiment of the present invention and is substantially the same as the first embodiment. The difference between the second embodiment and the first embodiment lies in that: the seesaw-type wave power generating device 1 has a third connecting pipe 81 and a fourth connecting pipe 82. One end of the third connecting pipe 81 is in communication with the first buoy 10, and the other end thereof is in communication with the impeller generator 30. One end of the fourth connecting pipe 82 is in communication with the second buoy 20, and the other end thereof is in communication with the impeller generator 30 and the third connecting pipe 81. The impeller generator 30 is provided at the intersecting portions of these connecting pipes 41, 42, 81 and 82. In the present embodiment, the first connecting pipe 41, the second connecting pipe 42, the third connecting pipe 81, and the fourth connecting pipe 82 are arranged in an X-shaped structure. However, those skilled in this art may contemplate that the arrangement of these connecting pipes may be suitably changed according to practical demands.

A first check valve 411 is provided in an intersecting portion between the first connecting pipe 41 and the first buoy 10. A second check valve 421 is provided between an intersecting portion between the second connecting pipe 42 and the second buoy 20. The orientation of the first check valve 411 when it is opened is identical to that of the second check valve 421. Further, a third check valve 811 is provided in an intersecting portion between the third connecting pipe 81 and the first buoy 10. A fourth check valve 821 is provided between an intersecting portion between the fourth connecting pipe 82 and the second buoy 20. The orientation of the third check valve 811 when it is opened is identical to that of the fourth check valve 821, but is reverse to that of the first check valve 411 or the second check valve 421. Further, an anchoring element 90 is provided under the first buoy 10 and the second buoy 20. The anchoring element 90 is used for anchoring the seesaw-type wave power generating device 1. Further, the interiors of the first buoy 10 and the second buoy 20 are filled with a liquid 2.

Please refer to FIG. 1, which is a schematic view showing the seesaw-type wave power generating device of the present invention. An end of a hawser 91 is fastened to the anchoring element 90 of the device 1, and the other end thereof is fastened to a weight 3 (or a foundation built on a riverbed or seabed). With this arrangement, the seesaw-type wave power generating device 1 bobs on the water, whereby the impeller generator 30 can generate electricity.

FIGS. 6 to 9 are schematic views showing the operation of the seesaw-type wave power generating device of the present invention. Please refer to FIGS. 6 and 7 first. The first buoy 10 and the second buoy 20 bob on the water 4. When the fist buoy 10 is located at a higher position than the second buoy 20, the first check valve 411 and the second check valve 421 are opened, so that the liquid 2 in the first buoy 10 flows through the first connecting pipe 41 to lash the impeller generator 30 to cause its rotation, and flows into the first connecting pipe 42 and then the second buoy 20. Please refer to FIGS. 8 and 9. When the second buoy 20 is located at a higher position than the first buoy 10, the third check valve 811 and the fourth check valve 821 are opened, so that the liquid 2 in the second buoy 20 flows through the third connecting pipe 81 to lash the impeller generator 30 to cause its rotation in a direction identical to the above, and flows into the fourth connecting pipe 82 and then the first buoy 10. In this way, the impeller generator 30 can rotate continuously to generate electricity. The electricity generated thereby is stored in the control box 50 for subsequent use.

Figure 10:
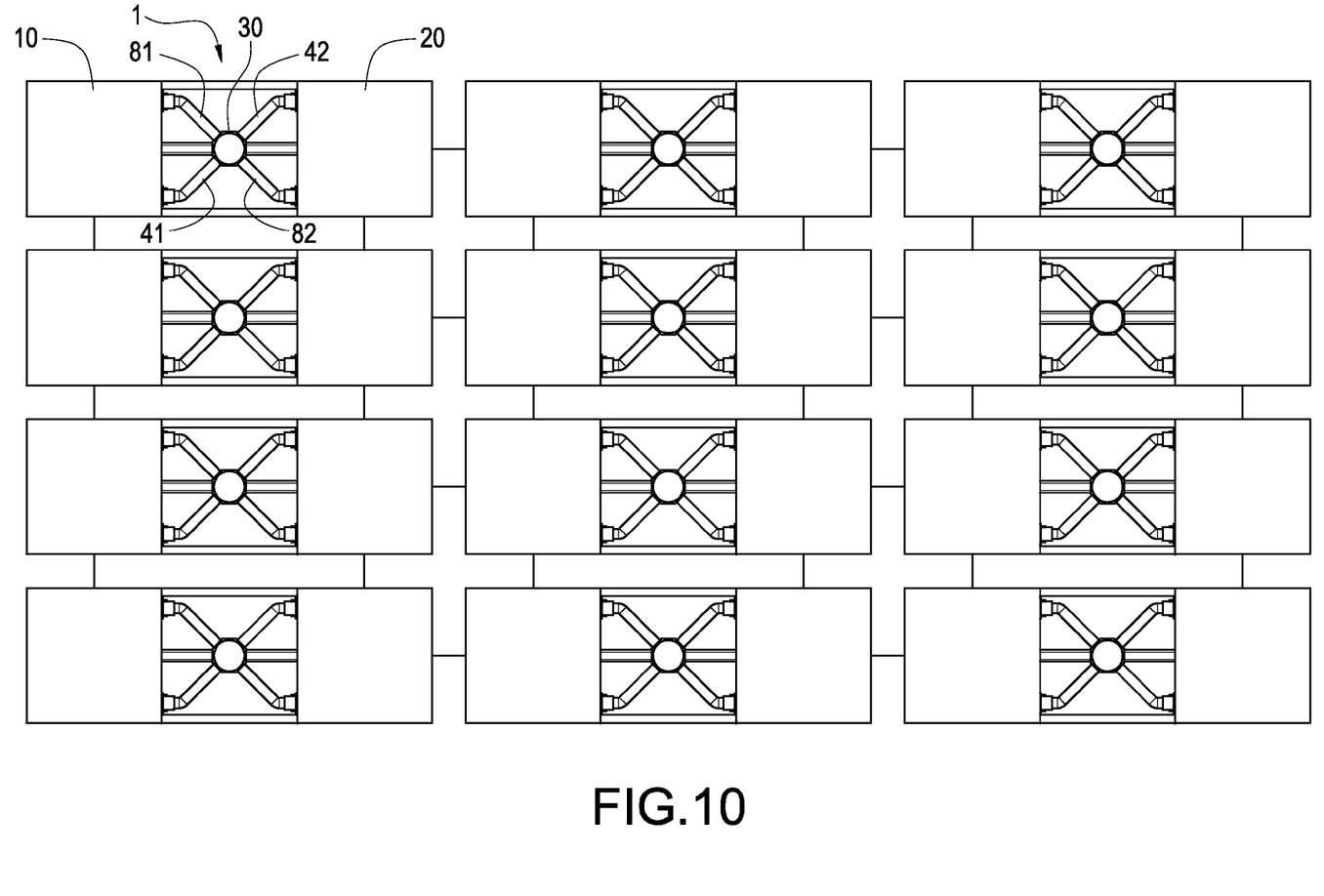
FIG. 10 is a schematic view of the present invention.

Please refer to FIG. 10, which is a schematic view showing the application of the seesaw-type wave power generating device of the present invention. According to the present invention, a plurality of devices 1 can be connected in series to generate a large amount of electricity.

Figure 11:
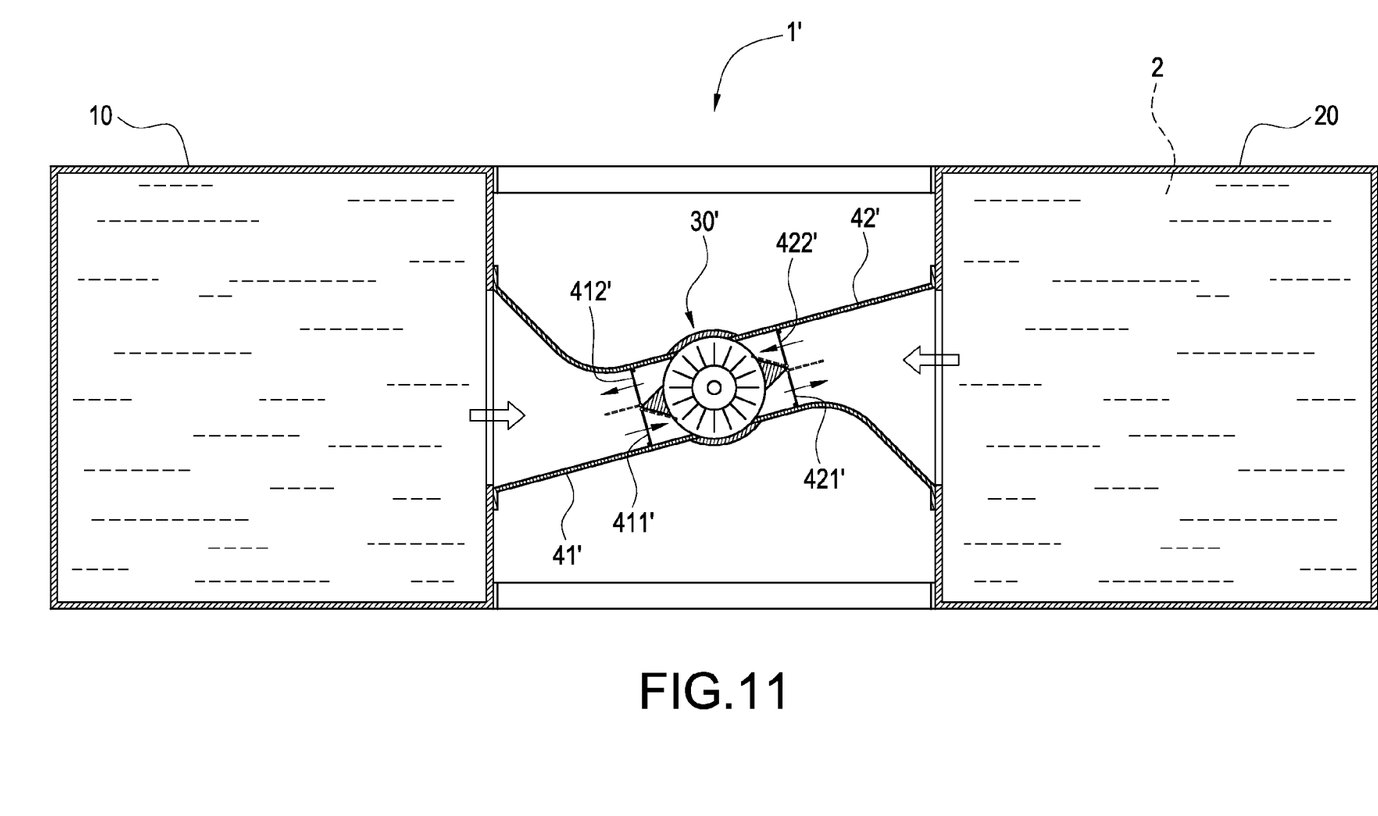
FIG. 11 is a schematic view showing the operation of the device according to a third embodiment of the present invention.

Please refer to FIG. 11, which shows the third embodiment of the seesaw-type wave power generating device of the present invention. The third embodiment is substantially the same as the first embodiment. The difference between the third embodiment and the first embodiment lies in that the first connecting pipe 41' and the second connecting pipe 42' are provided therein with two flowing channels, and a plurality of valves is provided to control the entrance of water. The intersecting portion between the first connecting pipe 41' and the impeller generator 30' is provided with two check valves 411' and 412'. Similarly, the intersecting portion between the second connecting pipe 42' and the impeller generator 30' is provided with two check valves 421' and 422'. The orientation of the check valve 411' when it is opened is identical to that of the check valve 421'. The orientation of the check valve 412' when it is opened is identical to that of the check valve 422', but is reverse to that of the check valve 411' or 421'.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A seesaw-type wave power generating device (1), filled therein with a liquid (2) and including:
 a first buoy (10);
 a second buoy (20) disposed on one side of the first buoy (10) at an interval;
 an impeller generator (30) disposed between the first buoy (10) and the second buoy (20);

a first connecting pipe (41) with one end being in communication with the first buoy (10) and the other end being in communication with the impeller generator (30); and a second connecting pipe (42) with one end being in communication with the second buoy (20) and the other end being in communication with the impeller generator (30);

wherein the liquid (2) is filled in the first buoy (10) and the second buoy (20), the first buoy (10) and the second buoy (20) bob on the water and water waves (4) causes the liquid (2) to flow back and forth between the first connecting pipe (41) and the second connecting pipe (42), thereby driving the impeller generator (30) to generate electricity.

2. The seesaw-type wave power generating device (1) according to claim 1, further including a control box (50) electrically connected to the impeller generator (30).

3. The seesaw-type wave power generating device (1) according to claim 2, wherein the control box (50) is in one of the first buoy (10) and the second buoy (20).

4. The seesaw-type wave power generating device (1) according to claim 1, further including a fixing support (60) supporting the impeller generator (30) and connected between the first buoy (10) and the second buoy (20).

5. The seesaw-type wave power generating device (1) according to claim 1, further including a third connecting pipe (81) and a fourth connecting pipe (82), wherein one end of the third connecting pipe (81) is in communication with the first buoy (10), and the other end thereof is in communication with the impeller generator (30), one end of the fourth connecting pipe (82) is in communication with the second buoy (20), and the other end thereof is in communication with the impeller generator (30) and the third connecting pipe (81).

6. The seesaw-type wave power generating device (1) according to claim 5, wherein the first connecting pipe (41), the second connecting pipe (42), the third connecting pipe (81), and the fourth connecting pipe (82) are arranged in an X-shaped structure.

7. The seesaw-type wave power generating device (1) according to claim 5, wherein a first check valve (411) is provided in an intersection portion between the first connecting pipe (41) and the first buoy (10), a second check valve (421) is provided in an intersection portion between the second connecting pipe (42) and the second buoy (20), the orientation of the first check valve (411) when it is open is identical to that of the second check valve (421).

8. The seesaw-type wave power generating device (1) according to claim 7, wherein a third check valve (811) is provided in an intersection portion between the third connecting pipe (81) and the first buoy (10), a fourth check valve (821) is provided in an intersection portion between the fourth connecting pipe (82) and the second buoy (20), the orientation of the third check valve (811) when it is open is identical to that of the fourth check valve (821).

9. The seesaw-type wave power generating device (1) according to claim 8, wherein the orientation of the third check valve (811) or the fourth check valve (821) is reverse to that of the first check valve (411) or the second check valve (421).

10. The seesaw-type wave power generating device (1) according to claim 1, further including an anchoring element (90) provided under the first buoy (10) and the second buoy (20) for anchoring the seesaw-type wave power generating device (1).

\* \* \* \* \*